United States Patent [19]

Braun et al.

[11] Patent Number: 5,467,750
[45] Date of Patent: Nov. 21, 1995

[54] METHOD OF CONTROLLING ENGINE OUTPUT TORQUE

[75] Inventors: Hans Braun; Ulf Weinecke, both of Stuttgart; Kurt Maute, Sindelfingen; Wolfgang Strauss, Denkendorf, all of Germany

[73] Assignee: Mercedes-Benz AG, Stuttgart, Germany

[21] Appl. No.: 240,825

[22] Filed: May 11, 1994

[30] Foreign Application Priority Data

May 12, 1993 [DE] Germany .................. 43 15 885.4

[51] Int. Cl.$^6$ .................................................. F02D 41/00
[52] U.S. Cl. .................................................. 123/350
[58] Field of Search .................................. 123/350, 349, 123/352, 399, 340, 488, 319, 333; 180/179

[56] References Cited

U.S. PATENT DOCUMENTS

| | | | |
|---|---|---|---|
| 4,846,132 | 7/1989 | Binnewies | 123/488 |
| 5,036,936 | 8/1991 | Kawano et al. | 180/179 |
| 5,048,042 | 9/1991 | Kratt et al. | 123/333 |
| 5,078,109 | 1/1992 | Yoshida et al. | 123/350 |
| 5,109,818 | 5/1992 | Yoshida | 123/319 |
| 5,197,433 | 3/1993 | Dykstra et al. | 123/350 |
| 5,203,423 | 4/1993 | Fujiwara et al. | 180/179 |
| 5,245,966 | 9/1993 | Zhang et al. | 123/399 |
| 5,282,449 | 2/1994 | Takahashi et al. | 123/350 |

FOREIGN PATENT DOCUMENTS

| | | | |
|---|---|---|---|
| 0154509 | 9/1985 | European Pat. Off. | 123/350 |
| 0271774 | 6/1988 | European Pat. Off. | 123/350 |
| 3238189 | 4/1984 | Germany | 123/350 |
| 3909711 | 10/1989 | Germany | 123/350 |
| 3924922 | 2/1990 | Germany | 123/350 |
| 3940681 | 6/1990 | Germany | 123/350 |
| 3844353 | 7/1990 | Germany | 123/350 |
| 3905736 | 8/1990 | Germany | 123/350 |
| 4100355 | 9/1991 | Germany | 123/350 |
| 4112540 | 10/1992 | Germany | 123/350 |
| 2178196 | 2/1987 | United Kingdom | 123/350 |
| 2190202 | 11/1987 | United Kingdom | 123/350 |

*Primary Examiner*—Raymond A. Nelli
*Attorney, Agent, or Firm*—Klaus J. Bach

[57] ABSTRACT

In a method of providing a desired output torque for an internal-combustion engine a desired air mass-flow value or a desired load value is determined from a desired output torque value in dependence on the engine speed and the throttle-valve opening angle, and the measured actual value is adjusted to the respective desired value by control of the throttle-valve opening angle. A conversion between load and air mass flow takes place by means of a load filter which compensates for the deviations, occurring in dynamic operating states, of the measured air mass flow from the air mass flow actually flowing into the combustion chamber of the engine and a transition between the two regulating methods can take place continuously or in a switched manner.

6 Claims, 2 Drawing Sheets

METHOD OF CONTROLLING ENGINE OUTPUT TORQUE

BACKGROUND OF THE INVENTION

The invention relates to a method for providing a desired output torque or an internal-combustion engine, in which deviations or an air mass flow, as measured by means or an airflow sensor, from the air mass flow actually supplied to the combustion chamber or the engine as they occur in dynamic operating states are compensated for by means or a load filter.

German Offenlegungsschrift 3,924,922 discloses a traction force control for an internal-combustion engine, in which, for each operating cycle, the difference between a predetermined desired intake-air quantity and the actually measured intake-air quantity per engine revolution is determined and the throttle-valve opening angle is corrected on the basis of this signal.

Moreover, German Offenlegungsschrift 3,940,681 discloses a throttle-valve position-regulating device, in which the deviation of the intake-air quantity, as measured by means or an airflow sensor, from a preset command-air quantity is determined. In addition, this mass-flow control includes a feedback control which varies the throttle-valve position in such a way that the deviation is reduced to zero, with a correcting element or the first order for compensating for the delay in the determination or the airflow sensor.

A disadvantage of these arrangements is that deviations which occur in dynamic operating states as a result of time-dependent pressure changes in the intake pipe and in the combustion chamber are not taken into account. Although, in the second arrangement, a correction is provided for the intake-air quantity determined by the airflow sensor, this correcting element of the first order can compensate only for the delay in the determination of the airflow sensor.

The object of the present invention is, therefore, to provide a method of controlling the torque generated by an internal-combustion engine in which the throttle-valve opening angle is corrected in such a way that, in dynamic operating states of the internal-combustion engine, the deviation of the torque actually provided from the predetermined desired torque is minimized.

SUMMARY OF THE INVENTION

To optimize the torque control of internal combustion engines, it would be advantageous if a torque-control circuit were available. However, if there is no torque sensor, the torque control must be carried out via a value correlated with the torque. Either the load, that is to say the air mass per operating cycle in the cylinder, or the air mass flow can be used as such a value, wherein, with mass-flow control, an average mass low during one operating cycle is processed as a desired value.

In a method of providing a desired output torque for an internal-combustion engine a desired air mass-flow value or a desired load value is determined from a desired output torque value in dependence on the engine speed and the throttle-valve opening angle, and the measured actual value is adjusted to the respective desired value by control of the throttle-valve opening angle. A conversion between load and air mass flow takes place by means of a load filter which compensates for the deviations, occurring in dynamic operating states, of the measured air mass flow from the air mass flow actually flowing into the combustion chamber of the engine and a transition between the two regulating methods can take place continuously or in a switched manner.

However, in both control circuits, there is the problem that, in dynamic operating states of the internal-combustion engine, the measured value as determined by an airflow sensor is not the same as the actual air mass flow into the combustion chamber. With load control, therefore, for each operating cycle, an actual load value is determined by means of a load filter, in which the air mass which has actually flowed into the combustion chamber during the last operating cycle is calculated by means of an intake-pipe model from the a mass flow measured by the airflow sensor. The correct ed actual load value is then fed to the reference point of the control circuit instead of the measured load value.

In contrast, with mass-flow control, by means of a load filter, a desired value for the air mass flow past the airflow sensor is determined in an opposite manner from a predetermined desired load value, that is to say from the air mass which actually flows into the combustion chamber per operating cycle, and this corrected desired mass-flow value is then fed to the reference point of the control circuit. In order to guarantee good reaction times also at low engine speeds, the desired-value setting may take place several times per operating cycle, in which case a timed load filter is used.

In order to guarantee an optimum torque setting at all operating points, it is also possible to provide both load control and mass-flow control, with a change-over taking place dependent on the engine speed and on the throttle-valve position.

DESCRIPTION OF PREFERRED EMBODIMENTS

Figure 1:
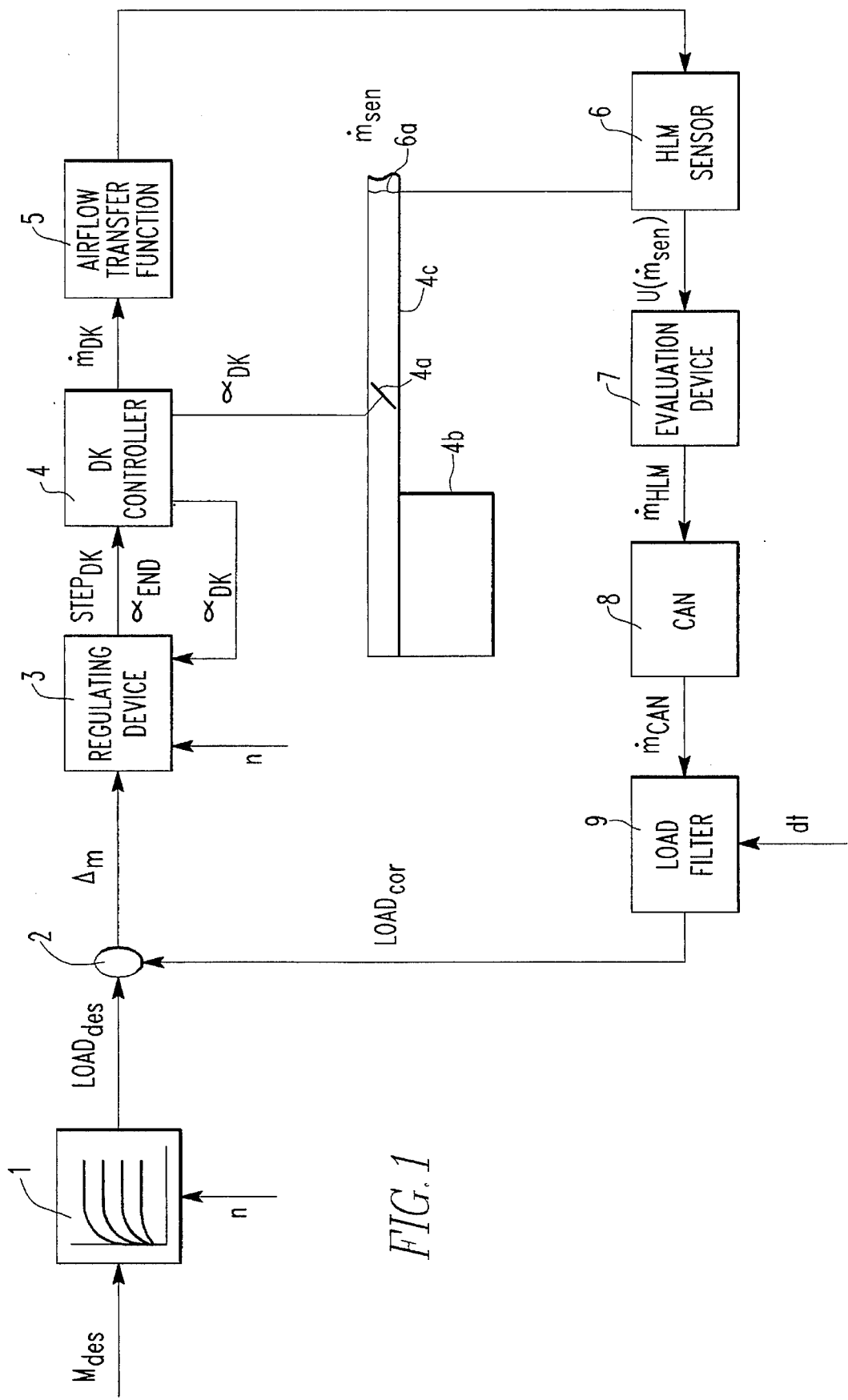
FIG. 1 is a basic representation of a load-regulating circuit according to the invention.

FIG. 1 illustrates the structure of a load-based control circuit according to the invention. A desired load value $load_{des}$ is determined From a preset desired torque $M_{des}$ dependent on the engine speed n by means of a family of characteristics 1. The desired load value $load_{des}$ is subsequently fed to the reference point 2 of a load-based control circuit. At the reference point 2, a mass difference $\Delta m$ is determined after each operating cycle TN of the internal-combustion engine, from the desired load value $load_{des}$ and a corrected actual load value $load_{cor}$ and is then fed to the regulating device 3. The regulating device 3 supplies as an output value a linearized angular throttle-valve position $\alpha_{end}$ which, by means of a stepper control, is converted into increment s $step_{DK}$ related to the actual throttle-valve position $\alpha_{DK}$ and is fed to a throttle-valve controller 4 operating a throttle valve 4a for controlling the air flow to an engine 4b. Moreover, in the throttle-valve controller 4, the actual throttle-valve position angle $\alpha_{DK}$ is determined and supplied to the regulating device 3.

In the intake pipe of the internal-combustion engine, t he air mass flow $\dot{m}_{sen}$ is measured by an airflow sensor 6 having a sensor element 6a located in the intake pipe 4c upstream of the throttle valve. However, since the airflow sensor element 6a is separated in space from the throttle valve, the airflow mass $\dot{m}_{sen}$ measured by the airflow sensor 6 does not necessarily always coincide with the air mass flow $\dot{m}_{DK}$ actually flowing through the throttle valve. This influence is defined by a flow transfer function 5. The airflow sensor 6, which is preferably designed as a heated-wire air-mass meter (hereafter called HLM sensor), supplies a voltage $U(\dot{m}_{sen})$ dependent on the air mass flow $\dot{m}_{sen}$. An air mass flow $\dot{m}_{HLM}$ is determined from this voltage $U(\dot{m}_{sen})$ in an evaluation device 7 and is subsequently fed to a load filter 9 by way of a data-transfer device 8. In the load filter 9, a corrected actual load value $load_{cor}$ is calculated from the air mass flow value $\dot{m}_{CAN}$ supplied thereto on the basis of the actual duration dt of an operating cycle TN and is fed to the reference point 2 of the load-regulating circuit as described above.

This indirect method of load control for obtaining a desired torque Mdes has to be adopted when direct torque control cannot be carried out because of the lack of a torque sensor. However, instead of the above-described family of characteristics 1, any other known method, by which a corresponding desired load value $load_{des}$ can be determined from a desired torque $M_{des}$, can be used. The control algorithm is calculated after each operating cycle TN, that is to say whenever a new corrected actual load value loadcor is available. In the regulating device 3, a differential mass flow $\Delta\dot{m}$ is determined from the mass difference $\Delta m$ by means of the current engine speed n. From this differential mass flow $\Delta\dot{m}$ and the actual throttle-valve position $\alpha_{DK}$, a set value for the throttle-valve angle $\alpha_{end}$ is then calculated by linearization using the equation $$\alpha_{end} = \arccos\left( \cos(\alpha_{DK}) - \frac{\Delta\dot{m}_{Reg}}{A_O * c * \rho_{air} * 3600} \right)$$

in which $\alpha_{end}$ is the new set value, $\alpha_{DK}$ is the actual throttle-valve position, $\Delta\dot{m}_{reg}$ is the differential mass flow weighted according to a PID algorithm, $A_o$ is the opening area of the throttle valve at a throttle-valve angle of 90°, c is the flow velocity and $\rho_{air}$ is the density of air. Finally, the set value $\Delta_{end}$ also has to be converted, for the stepping motor, into increments, $step_{DK}$, related to the actual throttle-vale position $\alpha_{DK}$.

The load filter, which, synchronously with the operating cycle, describes the relation between the air mass flow $\dot{m}_{HLM}$ measured on the HLM sensor 6 and the mass $load_{con}$ actually flowing into the combustion chamber, is obtained by means of the following algorithm:

$$TL_n = \frac{(a*SUM_n - b*SUM_{n-1} + (256 - a + b)*TL_{n-1})}{256}$$

in which $SUM_n$ and $SUM_{n-1}$ are the air masses on the HLM sensor which are added together in the last or respectively penultimate operating cycle TN, $TL_{n-1}$ is the last output value of the load filter 9, and a and b are speed-dependent parameters to be adapted to the geometry of the intake pipe and combustion chamber. The differential term in the equation describes the assignment delay.

Figure 2:
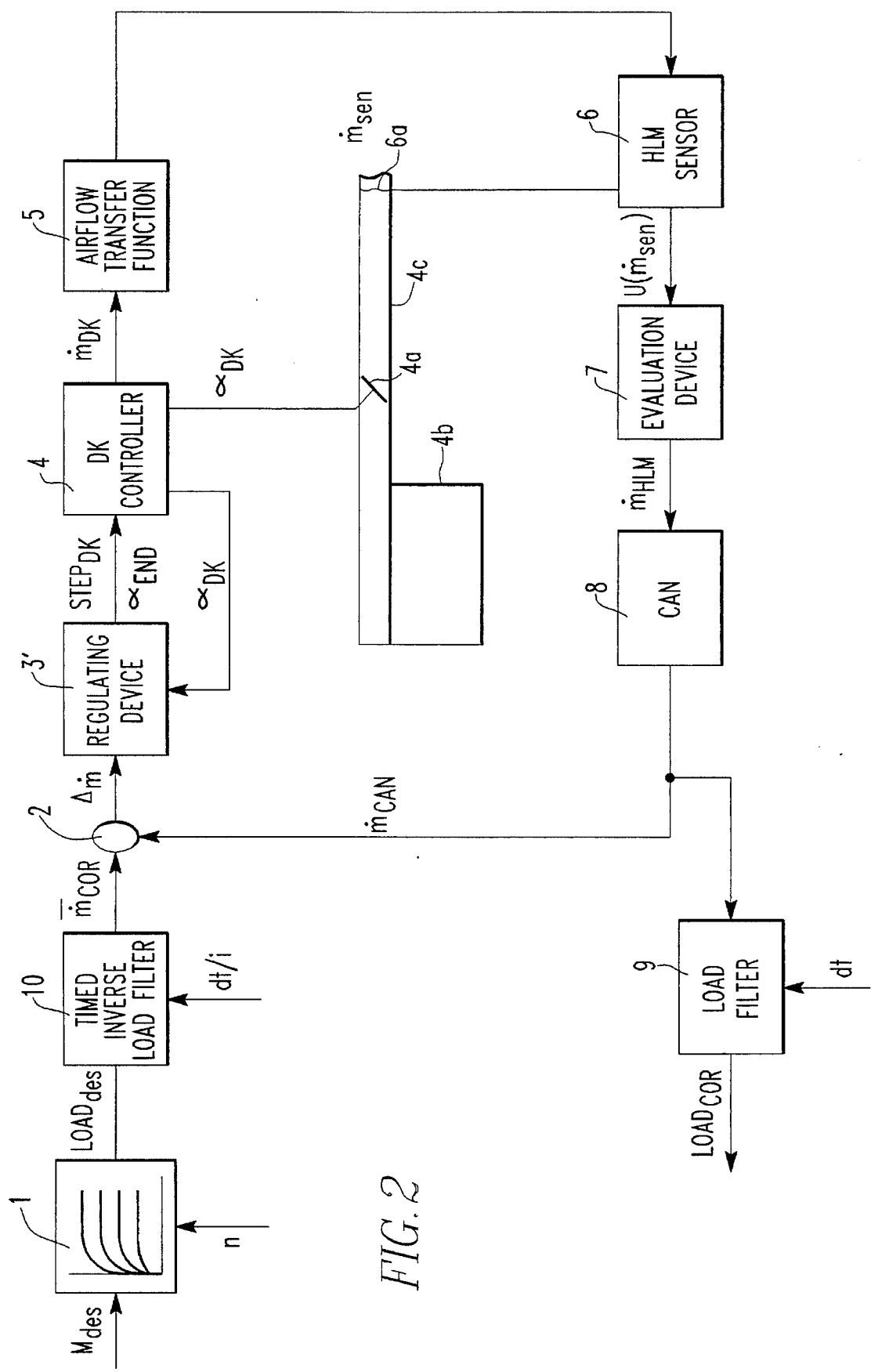
FIG. 2 is a basic representation of a mass-flow regulating circuit according to the invention.

In addition to the load control described above, a mass-flow control may be used in order to set a predetermined desired torque $N_{des}$. The arrangement of a mass-flow band control according to the invention is shown in FIG. 2, parts identical to those in FIG. 1 being designated by the same reference symbols. In contrast to FIG. 1, in the mass-flow control, the air mass flow $\dot{m}_{sen}$ measured by the HLM sensor 6 is not corrected, but, starting from a desired load value $load_{des}$, a corrected average desired mass-flow value $\bar{m}_{cor}$ is predetermined in such a way that, with adjustment regulation of the actual mass-flow value $\dot{m}_{HLM}$ to this corrected average desired mass-flow value $\bar{m}_{cor}$, the air quantity $m_L$ actually flowing into the combustion chamber becomes the same as the predetermined desired load value $load_{des}$ even under dynamic operating conditions of the internal-combustion engine.

Whereas, in the load filter 9, the air mass $load_{cor}$ in the combustion chamber is determined from the air mass $\dot{m}_{HLM}$ at the HLM sensor 6, taking into account the flow transfer function 5, with mass-flow based control, a mapping in the opposite sense is required. This inverse load filter 10 is defined by the inverse flow transfer function, the following equation applying to the relation between the inverse and the non-inverse load filter in the Laplace plane:

$$H(s)*H^{-1}(s)=1.$$

Thus, the inverse load filter 10 is obtained by an exchange of dependent and independent variables from the non-inverse load filter 9. The presetting for the air mass $m_{cor}$ to be set per operating cycle TN thus becomes:

$$m_{cor}(TN) = \frac{256*load_{des}(T_N) - (256 - a + b)*load_{des}(T_{N-1}) + b*m_{HLM}(T_N - 1)}{\alpha}$$

The parameterization for a and b is selected so that the inverse load filter 10 has high-pass characteristics. For this purpose, the factors a and b are likewise predetermined in dependence on speed.

A further difference with respect to the load control is that not masses but mass flows are compared at the reference point 2. For this purpose, not only the dynamically corrected average desired mass-flow value $\bar{m}_{cor}$, but also the actual mass-flow value $\dot{m}_{HLM}$ measured by the HLM sensor 6 and provided directly by means of the data-transfer device 8, is supplied to the reference point 2. As an output value, therefore, the reference point 2 determines a differential mass flow $\Delta\dot{m}$ which can then be supplied directly to the regulating device 3'. So that an actual load value $load_{cor}$ can additionally be provided for the engine control, the actual mass-flow value $\dot{m}_{HLM}$ as determined by the HLM sensor 6 can continue to be fed to the load filter 9.

In order to make it possible to react quickly to torque requirements even at low engine speeds n, it is also possible to use a timed inverse load filter 10, by means of which changes in the input variable $load_{des}$ can be taken into account even during an operating cycle TN.

With the formulation $$\sum_{TN}^{TN+1} \dot{m}_{HLM} = \sum_{TN}^{TN+dt} \dot{m}_{HLM} = \sum_{TN+dt}^{TN+1} \dot{m}_{HLM}$$

a desired value for the average mass flow is calculated as an output value of the filter at the start of an operating cycle TN:

$$\bar{m}_{cor}(TN) = \frac{256*\text{load}_{des}(TN) - (256-a+b)*\text{load}_{des}(T_{N-1}+t_{zw}) + b*\sum_{TN-1}^{TN} m_{HLM}}{a*dt}$$

in which $\text{load}_{des}(TN)$ is the desired load value at the start of the operating cycle TN, $\text{load}_{des}(T_{N-1}+t_{zw})$ is the actual load value last determined, and dt is the expected duration of an operating cycle TN. As already described further above, a and b are parameters to be adapted to the geometry of the intake pipe and combustion chamber.

If a new desired load value $\text{load}_{des}$ is predetermined during the operating cycle TN, the filter is newly calculated at this intermediate time $t_{zw}$, the air mass ($\bar{m}_{HLM}*t_{zw}$) which previously flowed past the DLM sensor 6 in this operating cycle TN being subtracted and the remaining mass to be set being related to the remaining time (dt-$t_{zw}$). It therefore follows for the desired value for the average mass flow at the intermediate time $t_{zw}$ that:

$$\bar{m}_{cor}(T_N+t_{zw}) = \frac{256*\text{load}_{des}(T_N+t_{zw}) - [256-a+b]*\text{load}_{des}(T_{N-1}+t_{zw}) + b*\sum_{TN-1}^{TN} m_{HLM} - \bar{m}_{HLM}*t_{zw}}{a*(dt-t_{zw})}$$

With this definition for the corrected average mass flow $\bar{m}_{cor}$ and the measured value of the HLM sensor 6, the control algorithm is calculated in fixed time increments, for example, of 1 ms.

The mass-flow based regulation is the control method which is considered to be more advantageous in dynamic terms. It is preferably employed at operating points with low flow pulsations. In contrast, the load based control is less sensitive to flow pulsations, since, in this method, the air mass is added up over an operating cycle TN. As already described above, however, at low engine speeds n, the load control cannot react sufficiently quickly to changes in the torque requirements $M_{des}$. It is therefore especially advantageous to combine the two control methods by switching between the two methods in dependence on operating parameters, preferably based on engine speed n and throttle-valve angle $\alpha_{DK}$. At the same time, the change-over is carried out preferably at the end of an operating cycle TN.

During change-over between the two control methods, both a switched and a continuous transition is possible. In order, in the switched transition, to prevent multiple switching when only slight signal fluctuations occur, a one-sided hysteresis in the form of a waiting time with integral multiples of operating cycles TN can be provided during the transition from load control to mass-flow control. In contrast, a return to load control from mass-flow control should be possible as early as with the next operating cycle TN.

In a continuous transition, both control circuits are activated simultaneously, the respective regulating values being weighted with factors. Since the regulating values are linearized in relation to the throttle-valve area in both methods, an additive correlation of the two signals is possible. The size of the factors, which can assume a value between 0 and 1, is determined in dependence on the above-mentioned operating parameters, the sum of the factors being selected to be equal to 1 for reasons of standardization.

What is claimed is:

1. A method of controlling the output torque of an internal combustion engine having a combustion chamber to which combustion air is supplied through an air inlet pipe including a throttle valve for controlling the combustion air flow to said combustion chamber, said method comprising the steps of:

providing a desired load value corresponding to a given desired output torque of said engine, determining an average air mass flow value required to achieve said desired load value, measuring the combustion air mass flow through said air inlet pipe to said combustion chamber, correcting said average air mass flow value by compensating for deviations occurring, in dynamic engine operating states, in said measured combustion air mass flow from an actual air mass flow through said inlet pipe to said combustion chamber, comparing, at predetermined time intervals, said corrected average air mass flow value with said measured combustion air mass flow value, and operating said throttle valve in a mass flow control state so as to reduce to zero any deviation of said measured combustion air mass flow value from said corrected average combustion air mass flow value.

2. A method according to claim 1, wherein said throttle valve is operated in said mass flow control state only at low engine speeds and with a small throttle valve opening angle, and, with increasing air mass flow through said air inlet pipe, said throttle valve is operated under engine load control, wherein said measured combustion air mass flow value is corrected instead of said average combustion air mass flow value.

3. A method according to claim 2, wherein change-over between operating said throttle valve under corrected average air mass flow control and under engine load control takes place essentially continuously, depending on engine operating conditions.

4. A method according to claim 3, wherein said change-over in engine control takes place in a controlled manner at the end of an engine operating cycle.

5. A method according to claim 3, wherein said change-over in engine control takes place after termination of a current operating cycle.

6. A method according to claim 3, wherein a change-over from engine load control to combustion air mass flow control takes place only after a load control state has been in effect for a predetermined number of operating cycles.

* * * * *